Figure 1:
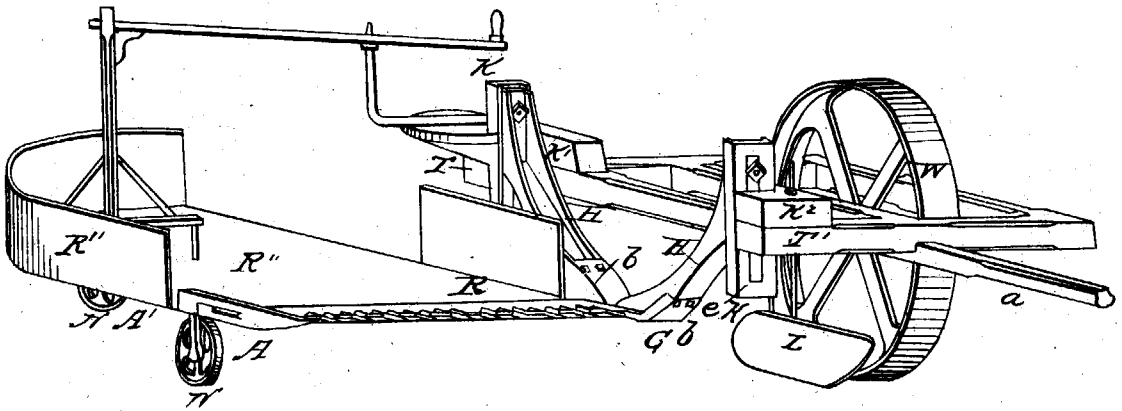

2 Sheets—Sheet 1.

E. B. FORBUSH.

Harvester.

No. 1,975. Reissued May 23, 1865.

Witnesses:
James H Quidley
Allan T. Jungston

Inventor:
C. Wheeler Jr.
By P. B. Forbush
Atty.

N. PETERS, Photo-Lithographer, Washington, D. C.

2 Sheets—Sheet 2.
E. B. FORBUSH.
Harvester.
No. 1,975. Reissued May 23, 1865.
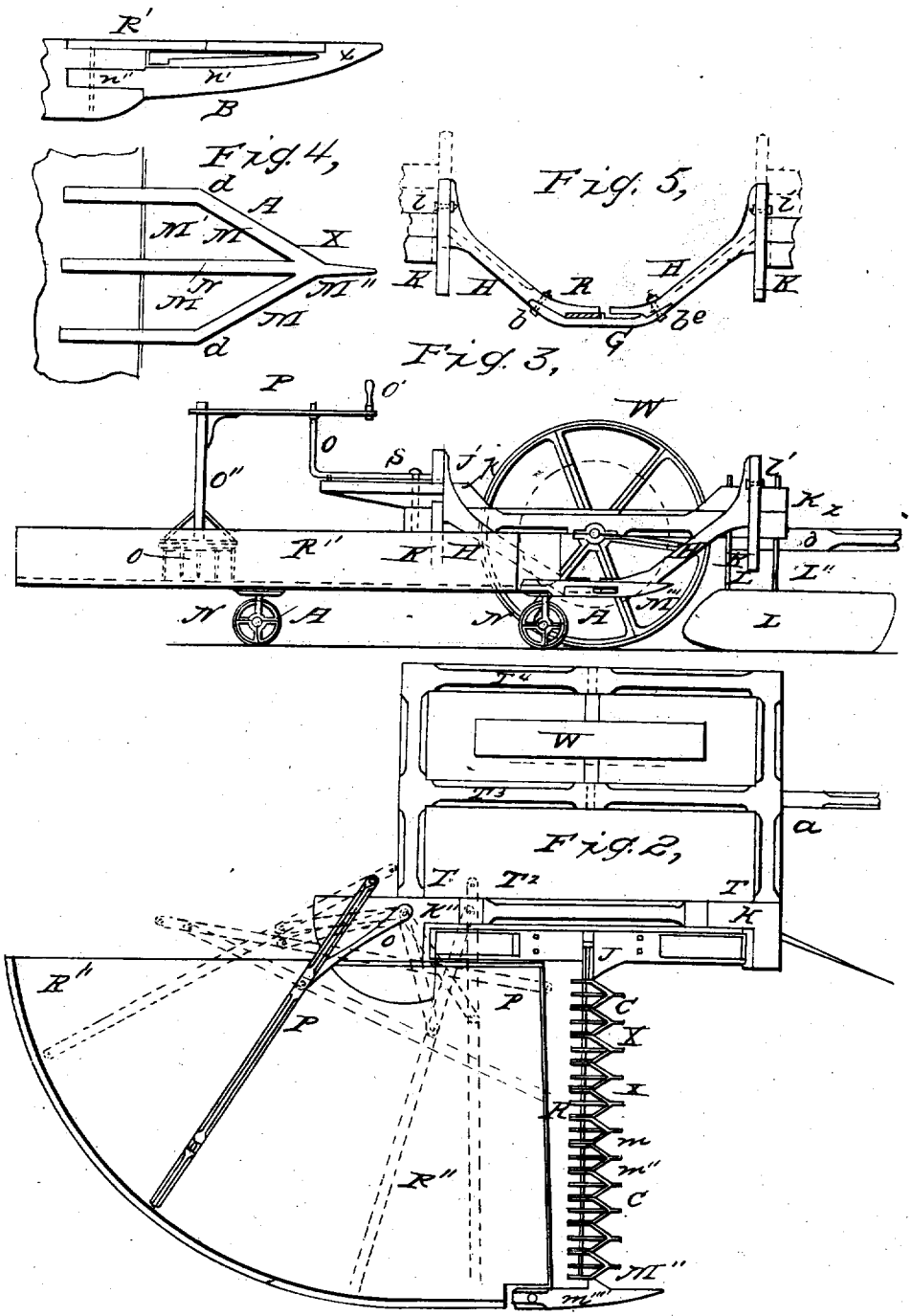
Witnesses:
James H. Gridley
Alem T. Sumpter
Inventor:
C. Wheeler Jr
By E. B. Forbush
Atty.
N. PETERS, Photo-Lithographer, Washington, D. C.

UNITED STATES PATENT OFFICE.

CYRENUS WHEELER, JR., OF POPLAR RIDGE, ASSIGNEE, BY MESNE ASSIGNMENTS, OF E. B. FORBUSH, OF BUFFALO, NEW YORK.

IMPROVEMENT IN HARVESTERS.

Specification forming part of Letters Patent No. 9,134, dated July 20, 1852; Reissue No. 376, dated July 8, 1856; Reissue No. 692, dated April 19, 1859; Reissue No. 1,975, dated May 23, 1865.

DIVISION D.

*To all whom it may concern:*

Be it known that I, ELIAKIM B. FORBUSH, of the city of Buffalo, in the county of Erie and State of New York, heretofore invented certain new and useful Improvements in Grain and Grass Harvesting Machines, for which Letters Patent of the United States were duly granted and issued to the said FORBUSH on the 20th day of July, 1852, and subsequently reissued on the 8th day of July, 1856, and again reissued on the 19th day of April, 1859, but which said last-mentioned Letters Patent are now deemed to be invalid and inoperative by reason of a defective or insufficient specification. Now, therefore, I, CYRENUS WHEELER, Jr., of Poplar Ridge, in the county of Cayuga and State of New York, assignee, by mesne assignments, of the whole interest of the said Letters Patent and of said invention and improvements, do hereby declare, pursuant to the statute in such case made and provided, that the following is a full and exact description of the integral parts of said invention and improvements, so far as described and claimed in this division or branch thereof, reference being had to the accompanying drawings, making a part of this specification, in which—

Figure I is a perspective view of said improvements as shown in a combined reaper and mower adjusted and arranged for reaping. Fig. II is a plan or top view of the same. Fig. III is a side view. Fig. IV is a plan or top view and a side view of one of the guard-fingers. Fig. V is a side view of a device called a "clamp," by which the finger-bar is supported and adjusted.

The nature of this invention, as described and claimed in this branch or division thereof, consists, first, in constructing and using a rake for raking the cut grain from the platform, having a pivoted support on the main frame in rear of the axis of the driving-wheel, so arranged that it will sweep over the platform and deliver the grain on the ground in rear of the main frame; second, in making and using a movable fulcrum upon which the rake is suspended.

To facilitate and render easy the work of discharging the cut grain from the platform a raking device is provided and mounted on the main frame in rear of the axis of the driving-wheel, as follows:

To the upper side of the rear right corner of the machine is attached the right-angled arm O, by means of the bolt or spindle S. On the upper end of the arm O is placed the rake-arm P, which extends on both sides of the point, where it is connected to the arm O, having on one end a handle, $o'$, and on the other a downwardly-projecting arm, $o''$, which carries the rake $o'''$, as shown in Figs. I and III. The rake can therefore be moved over the platform in almost any direction to remove the grain in suitable gavels for binding, it being so provided that the arm P can turn on the right-angled arm O, and the arm O can turn on the spindle or fulcrum-bolt S, and thus accommodate the rake to any position or movement required for an easy and efficient delivery of the grain. By constructing and using a rake upon this principle the grain can first be moved back a little on the platform in a line parallel with the line of motion of the machine, and then turned on the platform and delivered in rear of the machine. This is done by bringing the rake over the grain as it falls upon the platform, and then dropping it onto the grain at right angles to the stalks of grain, whereby the grain may be moved back on the platform as far as desired, and then turned and delivered in rear of the machine at the side of the platform. Some of the different positions of the rake are indicated by the dotted lines in Fig. II. It is sometimes desirable to compress or gather the grain to one side of the platform before its delivery. This is done by throwing the rake to the inside of the platform and parallel with the stalks of grain on the platform, and then moving it toward the other side until the grain is sufficiently compressed, and then the grain is turned upon the platform by an appropriate movement of the rake and delivered upon the ground in rear of the main frame and at the side of the platform. If preferred, however, (after the rake has engaged with the grain at right angles to its stalks,) the grain may be swept from the platform by one circular movement of the rake and delivered, as aforesaid.

It will be noticed that by the arrangement of this raking apparatus and platform the grain can be delivered at the necessary distance from the platform so as to render the delivery complete, whether the stalks of grain be short or long. The arrangement is also such that the rake can be made to engage with the grain at different points—to wit., at a point or line midway of the grain as it lies on the platform, or at any other desired point or line.

The rake may be operated by hand, (the raker riding upon the machine for that purpose,) or by power applied from the machine, as may be preferred.

The grain-platform R″ is made quadrant-shaped, and is connected with the finger-bar and cutting apparatus, as clearly shown in the drawings, Figs. I and II.

The cutting apparatus (and with it the grain-platform) is located in rear of a line drawn through the front of the driving-wheel, all of which has been fully described in other divisions of this invention, and clearly illustrated in the drawings, and therefore no further description thereof is deemed necessary in this division.

What I claim as the invention of the said FORBUSH, and desire to secure by these Letters Patent, is—

1. In combination with a cutting apparatus and a quadrant-shaped grain-platform, and both located in the rear of a line drawn through the front of the driving-wheel, a rake supported by a pivoted connection on the main frame in rear of the axis of the driving-wheel, and so arranged that it will sweep over the platform and deliver the grain in the rear of the main frame, substantially as set forth.

2. A movable fulcrum upon which the rake is suspended and operated in the manner substantially as described.

In testimony whereof I hereunto subscribe my name in the presence of two witnesses.

C. WHEELER, JR.

Witnesses:

W. H. MEAKER,

WM. ALLEN.